United States Patent Office 3,152,910
Patented Oct. 13, 1964

3,152,910
MAKING CAKE DOUGHNUT MIXES WITH
YOLK-CONTAINING EGG PRODUCTS
Takashi F. Sugihara, Richmond, and Leo Kline, El Cerrito, Calif., assignors to the United States of America as represented by the Secretary of Agriculture
Filed May 29, 1962, Ser. No. 198,652
1 Claim. (Cl. 99—94)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the preparation of novel products from egg yolk and the use of such products in the preparation of bakery goods. Further objects of the invention will be evident from the following description wherein parts and percentages are by weight unless otherwise specified.

Figure 1:
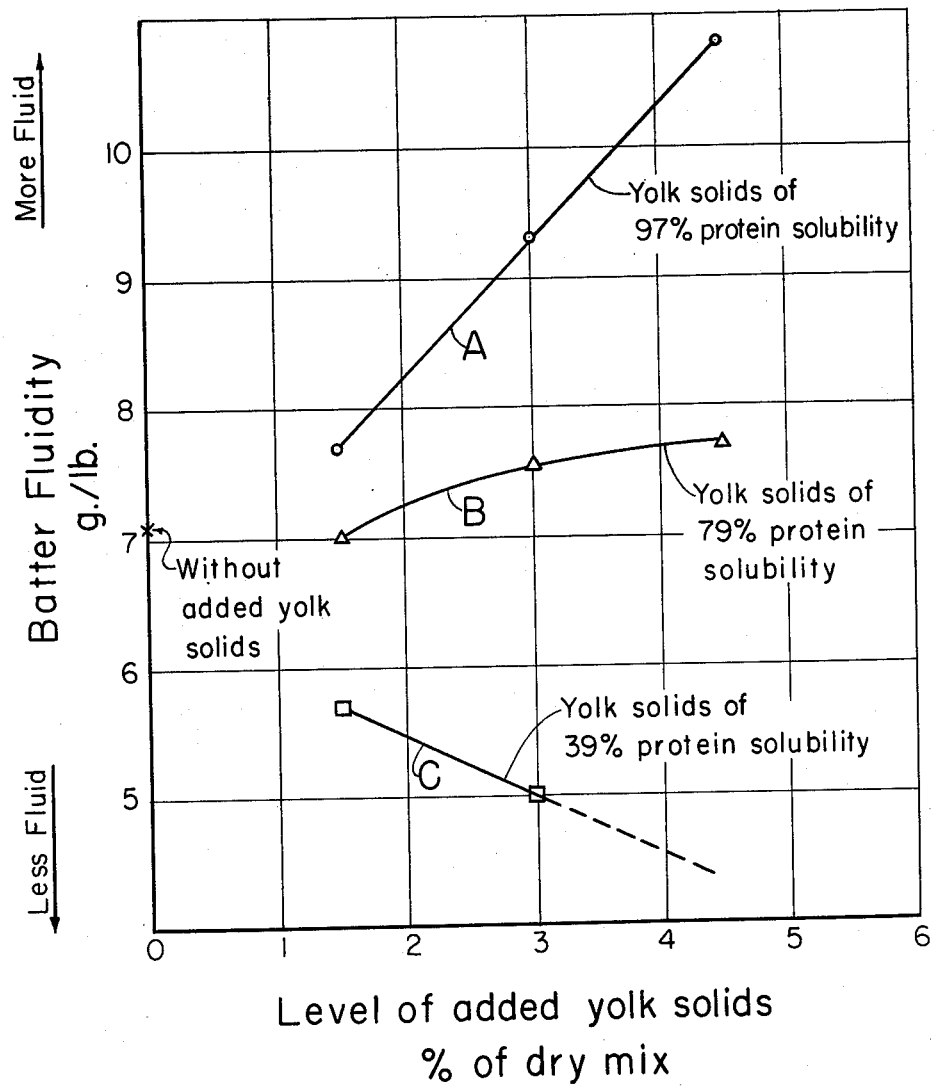
Figure 2:
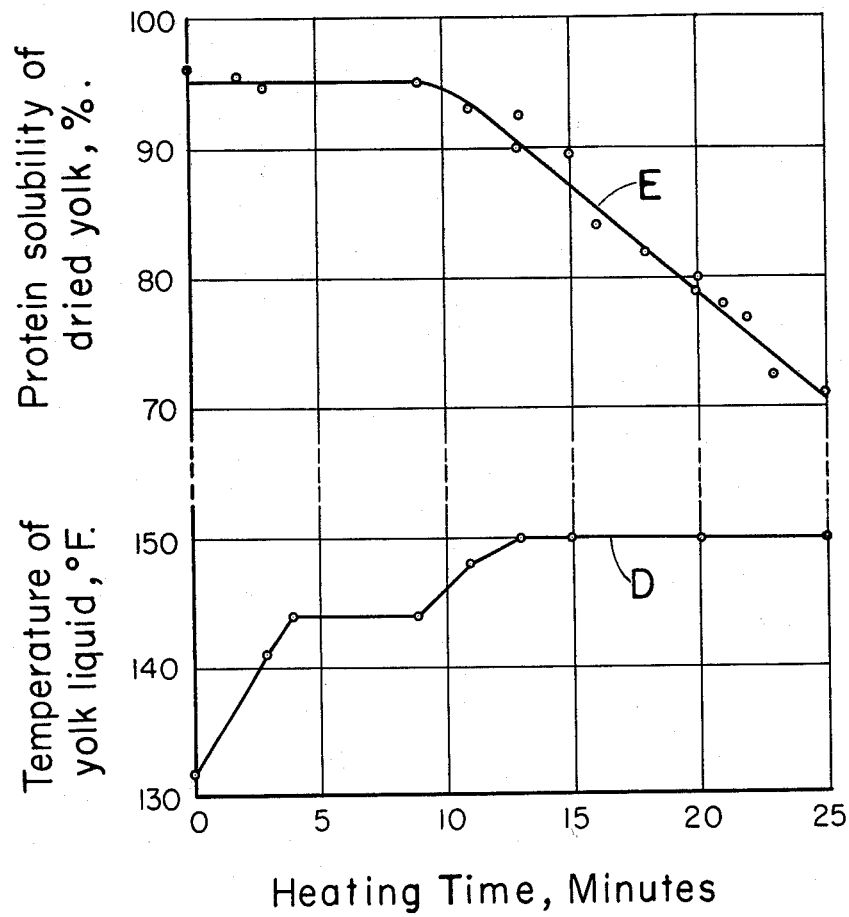

In the annexed drawing, FIG. 1 is a graph illustrating the effect of different egg yolk products on the fluidity of cake doughnut batter. FIG. 2 is a graph illustrating the effect of heating yolk liquid.

A particular field of utility of the invention is in the manufacture of cake doughnuts and this specific application of the invention will be stressed in the following paragraphs.

The commercial production of cake doughnuts follows a standardized pattern which involves the following typical procedure: The starting material is a cake doughnut mix—a dry mixture of flour, sugar, shortening, skim milk solids, dried egg yolk, salt, and baking powder. The doughnut maker generally purchases this mix directly from the miller or other manufacturer in the field of grain, flour, and the like. In the first step of doughnut manufacture, the mix is agitated with water to form a batter. This batter is then introduced into the doughnut machine. Such a machine usually includes a closed reservoir for holding the batter and applying air pressure thereto. This air pressure forces the batter into a die wherein doughnut-shaped portions of batter are formed. These doughnut-shaped portions of batter drop into a bath of hot fat wherein the batter is cooked, forming the familiar doughnut products which are then cooled, packaged, and sold.

As noted above, the procedure of making cake doughnuts follows a standard pattern. This standardization applies even to most of the conditions of operation. For example, the cartons or other containers used to pack the doughnuts for sale are standardized as to size and intended to hold a certain number of units, each of standard weight. This standardization of packaging materials in turn demands that the doughnut machine turn out doughnuts of uniform specified weight and dimensions. This then requires that the batter possess a standardized fluidity so that the batter when subjected to extrusion through the conventional die will yield batter portions of the proper weight and volume to form doughnuts of the proper weight, dimensions, and, of course, texture and density and fat content. This factor of fluidity of the batter is a critical item in the operation of the doughnut machine. Thus the machine is designed for operation on a batter of a designated fluidity and if the batter is too fluid the doughnuts tend to be flat and too large in diameter so that they will not fit the package. If the batter is too thick, the doughnuts tend to be too dense, irregular in shape, and too small for the package. In either case (too thin or too thick batter) the doughnuts exhibit an unsatisfactory star formation. Star formation refers to the creases about the hole of the doughnut and the existence of a well-defined symmetrical star formation is accepted as an index of quality in the industry since its presence indicates uniform puffing during cooking and other factors of concern to good eating quality.

One of the critical ingredients of the doughnut mix is dried egg yolk. This ingredient is required for its leavening action, that is, to yield a product having the proper cake-like texture and density. In the absence of egg yolk, the products are tough and so dense that in many cases they will not even rise to the top of the hot fat. Egg yolk is also essential to provide doughnuts of good eating quality. This factor is related, at least in part, to fat absorption during frying which, in turn, is proportional to the level of yolk used.

An aggravating problem in the art is that different lots of dried egg yolk impart varying characteristics to the doughnut mix, especially as concerns the water absorption character of the mix. Typically, the mixes containing different lots of dried egg yolk, when incorporated with the standard proportion of water, yield batters of varying fluidity. This situation poses a problem to the doughnut-mix manufacturer in standardizing his product so that it will yield doughnuts of the desired uniform shape and size. Unless such standardized product can be formulated, the mix will not be acceptable to the doughnut maker because it will not only upset his production line and packaging system but also adversely affect consumer acceptance of his product.

Although it is known that the water absorption characteristics of cake doughnut mixes may vary with different lots of added dried egg yolk, it has not previously been known what quality of the dried egg yolk is responsible for this variation. Our researches have demonstrated the factors which are the cause of the variation. In particular, we have found that the heating history of the dried egg yolk is the key to the problem. By "heating history" is meant the amount of heating, from the standpoint of both time and temperature, which was applied to the egg yolk material during the preparation and/or storage of the yolk solids. It might have been surmised that a dried egg yolk prepared under very carefully controlled conditions to avoid the least degree of heat-induced change would exhibit optimum qualities for the application at hand. Such, however, was not found to be the case. Thus, we have determined that such carefully prepared dried yolk products yield a doughnut mix of low water-absorption properties, that is, one which forms a batter too thin for optimum performance when the desired level of yolk is included. This situation is particularly aggravated as the level of dried yolk in the mix is increased because each increase in level of added yolk solids causes a corresponding increase in the fluidity of the batter. (This effect is demonstrated in curve A in FIG. 1 in the attached drawing.) This situation makes the carefully-prepared egg yolk product particularly disadvantageous in cases where the aim is to prepare doughnuts with high yolk content. We have further found that if the dried yolk has suffered extensive heat modification, it is equally unsuitable although in this case it is unsuitable because it causes the batter to become too thick, rendering the doughnuts too dense, irregular in shape, undersized, and with uneven fat absorption. Also, with egg yolk solids of this type, an increase in level of added yolk solids causes a proportionate decrease in fluidity —this effect thus being the exact opposite of that which occurs in the case of carefully prepared yolk solids free from heat-induced changes. (The effect of extensively heat-modified yolk solids on batter fluidity is demonstrated in curve C of FIG. 1 in the annexed drawing.) Finally, we have discovered that if the yolk product has undergone a moderate degree of heat modification, it exhibits optimum characteristics for the use in question. Thus, such dried yolk products when incorporated with the conventional ingredients form a dry doughnut mix of excellent water-absorption characteristics, that is, one having the proper fluidity when mixed with a standard proportion of water. Consequently, by using dried yolk products of this type the mix manufacturer can be assured of providing a uniform product which will always yield a batter of proper fluidity for day-to-day operation of the doughnut line. Moreover, such yolk products exert little, if any, change of batter fluidity with varying level of added yolk solids. This is a significant advantage in that it permits the mix manufacturer to alter the level of yolk to provide mixes of various grades as desired by different customers, while retaining a substantially uniform water-absorption characteristic in the several mixes. (The fact that yolk solids of this type exert little change in fluidity of the batter with varying levels of added yolk solids is demonstrated in curve B of FIG. 1 in the annexed drawing.) For example, the mix manufacturer can put up mixes containing anywhere from 1 to 5% or more of yolk solids and all the mixes on agitation with a standard proportion of water will yield batters within a suitable range for operation of the conventional doughnut machine.

In the processing of yolk products we have found it convenient to measure the extent of heat modification by the protein solubility of the product. Thus, as the extent of heat modification is increased the solubility of the product is proportionately decreased. This system furnishes a convenient method for selecting dried egg yolk products for particular uses. Applying this system in the present instance, the dried egg yolk products which have been subjected to moderate heat-induced change and which furnish the advantageous results described above may be designated as those having a protein solubility of 60 to 85%. A convenient method of ascertaining protein solubility is set forth below in connection with the detailed examples. The extent of heat-induced change can also be measured by the viscosity of the reconstituted product. However, such measuremetn is only an approximation because the viscosity of the reconstituted egg material may be affected by extraneous circumstances, i.e., those not pertaining to heat modification, and therefore the protein solubility system is preferred as being a more reliable index of heat-induced change.

A primary feature of the present invention concerns the preparation of yolk products which have been subjected to moderate heat-induced changes and which exhibit a protein solubility of about from 60 to 85%. Another feature of the invention concerns the use of such yolk products in the production of bakery goods, particularly in the formulation of cakes mixes, e.g., cake doughnut mixes. A particular advantage of such yolk products is that when incorporated in a cake mix they cause minimum change in batter fluidity, even when used at levels required for producing baked products of enriched egg content. The non-egg components of the cake mixes form no part of the present invention and are purely conventional, typically being flour, sugar, shortening, dry skim milk, baking powder, and flavoring.

The technique and conditions of heat treatment used to secure the desired goal of producing a dried yolk of moderate heat-induced changes (i.e., a protein solubility of 60–85%) may be varied widely. In general, one may employ any of three different techniques. One method involves heating the liquid egg yolk prior to dehydration. This is a preferred method and is described in more detail below. Another method involves using a temperature during the dehydration stage above the level generally employed in conventional yolk-drying procedures. Another technique involves subjecting the dried yolk product to storage at elevated temperatures, for example, storage for 60 days at 86° F. or storage for 14 days at 100° F. The storage is preferably in a nitrogen atmosphere to minimize color loss. Although the last mentioned technique of heat-modifying the egg yolk material provides the goal of desired decrease in protein solubility, it is not a preferred method because it also leads to undesirable flavor and color changes in the yolk solids. The other techniques [(1) heating prior to dehydration or (2) dehydration at temperatures above the conventional temperature levels], on the other hand, lead to reduction in protein solubility without significant change in color or flavor of the product. Of the several techniques for heat-modifying the yolk material, that involving the heating of the liquid yolk prior to dehydration is especially preferred because the degree of protein insolubilization can be most readily controlled and the possibility of damage to flavor and color is at a minimum. The heating of the liquid yolk can be accomplished in heat exchangers of various types, preferably those designed to provide especially high turbulent effects or other arrangements to prevent build-up or burn-on of thickened material on the hot surfaces. Typical of the types of apparatus which may be used are high-velocity tube or plate heat exchangers, swept-surface heat exchangers, steam injection heating systems, total sweep holding tanks provided with heating jackets, and various combinations of such systems. The specific conditions of time and temperature required to attain the desired end will vary. For example, if the temperature of heating is lower, the time of exposure to such temperature will have to be correspondingly longer than in another situation where the temperature of heating is higher. In most cases the yolk liquid is heated at a temperature of at least 148° F. because at temperatures below this range the desired modification is too slow to be of any practical usefulness. Temperatures above 148° F. may be advantageously used and, indeed, the temperature may be as high as 200° F. At any selected heating temperature the time required will vary depending on such factors as the protein solubility desired for the product and the composition of the yolk liquid—for example, its pH, its content of protein, the amount of adhering egg white, its content of sugars and mineral salts, etc. Since the time of treatment depends on so many variables, it is impossible to define it by numerical limits. However, in any particular case, the proper time of heat treatment required for a given lot of yolk liquid can be determined by heating samples of the material at different times and/or temperatures and determining the protein solubility of the various products. The resulting data will indicate the conditions required for treating the main batch of egg material. A typical curve providing such information is presented in FIG. 2 in the annexed drawing. It is recognized that it is conventional practice in the industry to pasturize yolk liquid prior to dehydration. However, pasteurization involves, at most, a heat treatment at 142–145° F. for not over 4 minutes and under such conditions the protein solubility of the product is virtually unaffected; that is, it remains well above the level of 90% (see FIG. 2). The heat treatment in accordance with the present invention involves a greater degree of heat-induced change than occurs with pasteurizing and this greater degree of heat treatment is deliberately applied to secure the goal of yielding a product of the desired protein solubility. The distinction between pasteurization conditions and the heat treatment in accordance with the invention is further shown in Example 3, infra.

In the foregoing description we have exemplified the production and utilization of our novel yolk products in a dehydrated condition. Dehydration of the yolk product is, of course, a logical and desirable step when the yolk material is to be incorporated into a blend of dry ingredients such as a cake mix. However, dehydration is not a critical step; it is merely a convenience; the yolk products can be advantageously utilized in liquid form. Thus, an alternative method for preparing cake products, typically cake doughnuts, involves formulating a cake mix containing all the conventional ingredients *minus* the dried yolk. To prepare a batter this cake mix is then blended with the liquid yolk product and water. Naturally, in such procedure, the amount of water is somewhat less than with a yolk-containing mix to compensate for the water in the liquid yolk. It is evident that with batters formulated in this manner the advantages above described will be equally obtained. For use in such technique, the yolk product is prepared in the preferred manner previously described; that is, the method involving heating the yolk prior to dehydration. Thus, in applying the present phase of the invention, egg yolk is subjected to heat treatment for a time and at a temperature sufficient to yield a product having a protein solubility of about from 60 to 85%. The heat-treated yolk liquid may be utilized directly for the formulation of batters or it may be stored and/or shipped as desired. Where it is not utilized directly it is preferred to keep it refrigerated, for example, at about 35–45° F. A convenient plan to use involves subjecting yolk liquid to the described heat treatment, then quickly cooling it to below 148° F. (to prevent further heat-induced change) and further chilling it to about 35–45° F., loading into containers, and holding at such refrigerated temperature level until it is desired to utilize it.

Although the main feature of the invention concerns the preparation and utilization of yolk products exhibiting moderate heat-induced change (that is, having a protein solubility of 60–85%) whereby to secure minimum change in batter fluidity, the teachings of the invention may be extended to other areas. Thus, our finding that the effect of yolk on batter fluidity is dependent on the heat treatment to which the yolk material has been subjected lends itself to the solution of another problem which is troublesome in the formulation of doughnut and other cake mixes. This problem stems from the fact that flours vary in their water-absorption characteristics. Thus, one lot of flour when mixed with a standard quantity of water will form a batter of greater or lesser fluidity than another lot of flour. This problem can be obviated by applying the principles of the invention. Thus, in the event that a particular lot of flour provides a batter of too great a fluidity, one would employ with it a yolk product (in dry or liquid form) which has been subjected to a substantial degree of heat-induced change whereby to decrease the fluidity of the batter. For such purpose one can use yolk products having a protein solubility less than 60% and as low as 20%. Such products may, if used solely by themselves as the source of egg, render the batter too thick and in such case it is obvious that part of the total egg requirement can be supplied by yolk product of none of moderate heat-induced change plus sufficient of the yolk product of lower protein solubility to provide the desired decrease inb atter fluidity. In a reverse situation where the type of flour used provides a batter which is too low in fluidity, one can increase the fluidity by using as the egg source, a yolk product (in dry or liquid form) which has suffered little heat-induced change; that is, one having a protein solubility of greater than 85% and up to the theoretical limit of 100%. Here again it is obvious that if such yolk product provides too fluid a batter, the total egg requirement may be supplied partly by it plus enough of the yolk product of higher protein solubility to establish the desired degree of batter fluidity. Thus, by taking into account the total egg level to be established in the cake mix, the water absorption character of the flour used, and applying the principles set forth that batter fluidity is affected by the heating history of the yolk material employed, one can correlate the type of yolk material with the characteristics of the non-egg ingredients of the cake mix to formulate cake mixes and batters of proper fluidity characteristics.

As described above, the egg yolk products of the invention are preferably dehydrated so that they can be blended with other dry ingredients to prepare cake mixes. The products may be dehydrated by any of the conventional methods used in egg drying. A convenient and generally satisfactory method is to use spray-drying techniques wherein the egg liquid is atomized through a nozzle into a large chamber through which heated air is passed. In a preferred technique of spray drying, a gas under pressure is injected into the liquid and the resulting gasified liquid is spray dried. This technique—described and claimed in the copending application of Kline, Meehan, and Sugihara, Ser. No. 142,741, filed October 3, 1961 (now Patent No. 3,115,413, granted December 24, 1963)—is preferred, particularly because the products have improved dispersibility. Thus, when the products are mixed with water they disperse rapidly—in a fraction of a minute—without clumping. In a typical embodiment of this method, the egg liquid to be dried is impregnated with carbon dioxide gas at a pressure of at least 15 lbs. per sq. in. gauge and the resulting gasified liquid is pumped, at a pressure at least as high as that used in the carbonation, to the spray nozzle of the spray drier when the atomized liquid is contacted with hot air in the usual way. Another useful procedure for conducting the drying involves forming the egg material into a foam, as by whipping air into it. The resulting foam is spread onto a surface as a thin layer and this layer of foam is contacted with a current of heated air—for example, at 120° F.—until the drying is complete. This procedure also has the benefit that the products are especially easy to disperse in water. In dehydrating the egg yolk materials of the invention, they may be dried as such or after incorporation of additives such as antioxidants; surface-acetive agents such as dispersing agents or emulsion stabilizers; carbohydrates; salts; etc. Typical of the carbohydrates which may be used are sucrose, corn syrup or solids, sorghum syrup or solids, malt syrup or solids, maltose, glucose, fructose, invert sugar, lactose dextrins, or other water-soluble carbohydrates or mixtures of carbohydrates.

EXAMPLES

The invention is further demonstrated by the following illustrative examples.

The protein solubility values referred to in the examples were determined in the following manner:

Two grams of yolk solids (moisture-free basis) were dispersed in 79 ml. of 10% aqueous KCl by slowly shaking for 1 to 1½ hours in a manner designed to minimize frothing. The dispersion was then filtered through a Whatman #12 folded filter paper. The nitrogen contents of the yolk solids and of the filtrate were determined by the Kjeldahl method and the percentage of the total nitrogen present in the filtrate was reported as protein solubility.

*Example 1*

A series of cake doughnut mixes were prepared by incorporating three different dried eg-yolk products, at different levels, into a conventional basic mix. The three egg-yolk products were as follows:

(A) A lot of fresh egg yolk was preheated to 125° F and with no holding time pumped into a spray drier wherein it was dried in a current of air at 250° F. Exhaust air temperature was 140° F. The dried product had a protein solubility of 97%.

(B) A lot of fresh egg yolk was heated to 148.5° F.±0.5° F. and held at this temperature for 30 minutes, then pumped into a spray drier wherein it was dried in a current of hot air (250° F.). Exahust air temperature was 140° F. The dried product had a protein solubility of 79%.

(C) A lot of fresh egg yolk was preheated to 125° F. and pumped into a spray drier wherein it was dried in a current of air at 350° F. with an exhaust temperature of 215° F. Extensive heat modification was caused by the high drying temperature. The dry product had a protein solubility of 39%.

The basic mix contained the following ingredients.

| Ingredient: | Proportion, percent of flour weight |
| --- | --- |
| Flour | 100 |
| Cane sugar | 39.2 |
| Corn sugar | 2.74 |
| Soybean oil | 5.48 |
| Dry skim milk | 5.48 |
| Calcium acid pyrophosphate | 1.81 |
| Sodium bicarbonate | 1.26 |
| Salt | 1.60 |

The flour used in the basic mix was of a selected grade to provide a batter of normal fluidity.

The mixes were agitated with the standard amount of water (38 parts water/100 parts dry mix) to make the several batters. These batters were then placed in a conventional doughnut machine as described hereinabove.

To test the effect of the three egg-yolk products, the fluidities of the different batters were measured. This was done by catching a doughnut-shaped portion of batter as it was ejected from the die and weighing it. The fluidity is expressed as the weight of the portion of batter (in grams) divided by the air pressure (in lbs. per sq. in. gauge) applied to the batter for forcing it into the shaping die. During a run of 8 dozen doughnuts, 16 batter portions were caught and weighed as ejected and the fluidity figures cited represent the average of the 16, or for the run. In this method of measurement, a higher figure denotes a higher fluidity. It is evident that the term "fluidity" is used in a sense opposite to that of viscosity. Thus, a high fluidity is equivalent to a low viscosity, and vice versa. The results obtained are tabulated below and graphically presented in FIG. 1 in the annexed drawing.

| Run | Identity of dried yolk | Protein solubility of dried yolk, percent | Proportion of dried yolk, percent of dry mix | Batter fluidity, g./lb. | Change in batter fluidity,[1] percent |
| --- | --- | --- | --- | --- | --- |
| 1 | None used | | None used | 7.1 | |
| 2 | A | 97 | 1.5 | 7.7 | +8.5 |
| 3 | A | 97 | 3.0 | 9.3 | +31.0 |
| 4 | A | 97 | 4.5 | 10.8 | +52.1 |
| 5 | B | 79 | 1.5 | 7.0 | −1.4 |
| 6 | B | 79 | 3.0 | 7.5 | +5.6 |
| 7 | B | 79 | 4.5 | 7.7 | +8.5 |
| 8 | C | 39 | 1.5 | 5.7 | −19.7 |
| 9 | C | 39 | 3.0 | 5.0 | −29.6 |

[1] Obtained from formula:
$$\frac{\text{difference in fluidity with and without added yolk solids}}{\text{fluidity without added yolk solids, or 7.1}} \times 100$$

The above figures are of interest as demonstrating that addition of yolk solids B caused the least change in fluidity of the batter, whereas addition of yolk solids A and C caused very marked change and in different directions.

The figures also illustrate that yolk solids B can be added in substantial amount without causing any marked change in fluidity of the batter. This signifies that doughnuts of superior taste and texture—attributable to higher yolk solids content—can be prepared without disturbing the standardized conditions of doughnut manufacture.

*Example 2*

The batters of runs 3, 4, 6, 7, and 9 were further evaluated by preparing doughnuts therefrom. In each case, the air pressure exerted on the batter was adjusted to provide doughnuts of the conventional 28-gram weight. The doughnuts so produced were then examined. The results are tabulated in the following table. (The batters of runs 1, 2, 5, and 8 were not evaluated as in these batters the yolk level was too low (1.5%) to provide the leavening action required for production of typical quality doughnuts.)

| Run | Identity of dried yolk | Protein solubility of dried yolk, percent | Proportion of dried yolk, percent of dry mix | Evaluation of doughnuts |
| --- | --- | --- | --- | --- |
| 3 | A | 97 | 3.0 | Symmetrical star, excellent shape and texture. |
| 4 | A | 97 | 4.5 | Poor star formation, doughnuts misshapen. |
| 6 | B | 79 | 3.0 | Symmetrical star, excellent shape and texture. |
| 7 | B | 79 | 4.5 | Do. |
| 9 | C | 39 | 3.0 | Poor star formation, doughnuts flat, undersized. |

These figures are of interest as demonstrating that dried yolk A (97% protein solubility) produced a satisfactory product only at the 3% yolk level; it could not be used to prepare the richer (4.5% yolk) product. Dried yolk B (79% protein solubility) produced good products at both the 3 and 4.5% yolk levels. Dried yolk C (39% protein solubility) was unsatisfactory even at the 3% yolk level.

*Example 3*

A batch of egg-yolk liquid containing 45% solids was subjected to a heating program, the temperature of the yolk being measured every minute. The yolk was first warmed to 131° F. (at which temperature little or no protein solubility change is observed in several hours), then heated to the conventional pasteurization range of 140–145° F. When the yolk reached this pasteurization temperature (approximately 3 to 4 minutes were required), the yolk was held at 144° F. for 5 minutes, then subjected to further heating until it reached 150° F. and held at this temperature for the duration of the experiment (25th minute). At intervals, samples of the heated yolk liquid were taken, cooled quickly, freeze-dried, and their protein solubility measured. The results are shown in the graphs in FIG. 2. Curve D represents the plot of temperature of the yolk liquid versus time; curve E represents the protein solubility of the dried product versus time of heating.

It is evident from FIG. 2 that at the conventional pasteurization temperature range, 140–145° F., no significant degree of protein insolubilization is effected, whereas at 148–150° the desired protein insolubilization occurs rapidly. Curve E can obviously serve as a pattern from whic hto derive conditions required to produce a dried yolk of desired level of protein solubility. It is also evident that by varying the temperature pattern, one can obtain a family of curves generally similar to curve E but at different temperature levels showing the relationship between time of heating and protein solubility of the product. Such curves will provide a wide choice of time-temperature coordinates which designate the heating programs required to yield a product of specified protein solubility.

Having thus described the invention, what is claimed is:

A method for preparing a cake doughnut mix which on mixing with water provides a batter of standard fluidity, said method comprising incorporating into the mix dried egg yolk having a protein solubility which is correlated with the water absorption properties of the flour in the mix in the following manner: employing dried egg yolk having a protein solubility greater than 85% and up to 100% in the event that the mix provides a batter less fluid than the standard; employing dried egg yolk having a protein solubility of 60 to 85% in the event that the mix provides a batter of standard fluidity; and employing dried egg yolk having a protein solubility less than 60% and as low as 20% in the event that the mix provides a batter more fluid than the standard.

References Cited in the file of this patent

UNITED STATES PATENTS

| | | |
|---|---|---|
| 2,093,786 | Swarthout et al. | Sept. 21, 1937 |
| 2,401,259 | Lloyd et al. | May 28, 1946 |
| 2,458,449 | Urbai net al. | Jan. 4, 1949 |
| 3,114,645 | Blanken et al. | Dec. 17, 1963 |

OTHER REFERENCES

Dollars in Doughnuts, by the Procter & Gamble Co., 1933, page 10.